US006831723B1

(12) United States Patent
Takeuchi

(10) Patent No.: US 6,831,723 B1
(45) Date of Patent: Dec. 14, 2004

(54) LIQUID CRYSTAL DEVICE WITH ELECTRODE ARRANGEMENT TO PREVENT SHORTING AND ELECTRONIC EQUIPMENT INCORPORATING THE SAME

(75) Inventor: Yutaka Takeuchi, Hotaka (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

(21) Appl. No.: 09/671,261

(22) Filed: Sep. 28, 2000

(30) Foreign Application Priority Data

Sep. 28, 1999 (JP) .......................................... 11-275250

(51) Int. Cl.[7] .............................................. G02F 1/1343
(52) U.S. Cl. ...................................... 349/139; 349/143
(58) Field of Search ................................ 349/139, 143, 349/192

(56) References Cited

U.S. PATENT DOCUMENTS

| 5,751,381 A | | 5/1998 | Ono et al. ..................... 349/42 |
| 5,838,411 A | * | 11/1998 | Hayakawa et al. .......... 349/139 |
| 5,870,163 A | | 2/1999 | Watanabe et al. ........... 349/149 |
| 5,986,739 A | * | 11/1999 | Kobayashi ................... 349/143 |
| 6,522,378 B1 | * | 2/2003 | Mizuno et al. .............. 349/139 |

FOREIGN PATENT DOCUMENTS

| JP | 63104024 | 5/1988 |
| JP | 02-273721 | 11/1990 |
| JP | A 04-166916 | 6/1992 |
| JP | U 6-8935 | 2/1994 |
| JP | 08006008 A | 1/1996 |
| JP | A 08-227079 | 9/1996 |
| JP | A 09-015581 | 1/1997 |
| JP | A 09-318962 | 12/1997 |
| JP | 09318962 | * 12/1997 | ......... G02F/1/1343 |
| JP | 10-333172 | 12/1998 |

OTHER PUBLICATIONS

Aug. 20, 2002 Japanese Foreign Office Communication.
EPO Search Report.

* cited by examiner

*Primary Examiner*—Tarifur R. Chowdhury
*Assistant Examiner*—Jeanne Andrea Di Grazio
(74) *Attorney, Agent, or Firm*—Oliff & Berridge, PLC

(57) ABSTRACT

A liquid-crystal device is provided which is free from short-circuiting between adjacent electrodes, which presents a high yield in the manufacturing process, and which facilitates the measurement of a wiring gap. The liquid-crystal device includes a plurality of color material layers arranged on a substrate, a light-shielding layer surrounding each of the color material layers, a protective layer covering the color material layers and the light-shielding layer, and a plurality of electrode strips arranged on the protective layer and extending from a formation region of the protective layer to an unformed region of the protective layer. The electrode width of the electrode strip on a step portion of the protective layer is set to be narrower than the electrode width of the electrode strip on the protective layer in an effective region of the liquid-crystal device. With this arrangement, the spacing between the electrode strips in the step portion becomes larger, preventing the electrode strips from shorting with each other.

5 Claims, 11 Drawing Sheets

LIQUID CRYSTAL DEVICE WITH ELECTRODE ARRANGEMENT TO PREVENT SHORTING AND ELECTRONIC EQUIPMENT INCORPORATING THE SAME

BACKGROUND OF THE INVENTION

1. Field of Invention

The present invention relates to a liquid-crystal device and electronic equipment incorporating the liquid-crystal device. More particularly, the present invention relates to a liquid-crystal device which prevents scanning electrodes from shorting with each other when the electrodes are produced by partly arranging a narrow portion in the electrode width of an electrode strip serving as a scanning electrode or a data electrode.

2. Description of Related Art

Conventionally, a liquid-crystal device that employs a TFD (Thin Film Diode) device, for example, includes a transparent substrate, namely a so-called array substrate, on which a TFD device and a pixel electrode are formed, and an opposing substrate opposing the transparent substrate.

Polarizers are respectively glued onto the surfaces of the transparent substrate and the opposing substrate, the surfaces being opposite to the opposing surfaces. Alignment layers are formed on the opposing surfaces of the transparent substrate and the opposing substrate. A liquid crystal layer and spacers are arranged between these opposing alignment layers.

FIG. 17 is a plan view showing a major portion of the opposing substrate of the above-referenced liquid-crystal device, and FIG. 18 is a cross-sectional view of the major portion of the opposing substrate, taken along line XVIII–XVIII' in FIG. 17. These figures are intended to explain the construction of the opposing substrate, and dimensions, sizes, and thicknesses of components shown here are different from the dimensional relationship of the actual opposing substrate.

Referring to FIG. 17 and FIG. 18, a plurality of color material layers 21 are formed on the opposing substrate 20, and a matrix of a light-shielding layer 22, constructed of chromium or the like, is arranged between the color material layers 21.

Further arranged on the opposing substrate 20 is a protective layer 23 which covers the color material layers 21 and the light-shielding layer 22, as shown in FIG. 17 and FIG. 18. The color material layers 21, the light-shielding layer 22 and the protective layer 23 form a so-called color filter. Referring to FIG. 18, the protective layer 23 has a step portion 23b formed by the color material layer 21 on the outermost outline of an effective region and a light-shielding layer outline portion 22a that forms the outermost configuration of the light-shielding layer 22. The protective layer 23 also has a step portion 23c formed by the thickness of the protective layer 23 at a protective layer peripheral portion 23a external to the light-shielding layer outline portion 22a. The total thickness of the step portion 23b and the step portion 23c, i.e., the height from the top surface (an unformed region 26 of the protective layer) of the opposing substrate 20 to the top surface of the protective layer 23 in the effective region 27, is approximately 5 $\mu$m in the typical liquid-crystal devices.

The protective layer 23 has a plurality of elongated rectangular electrode strips 24 formed thereon which function as scanning electrodes or data electrodes.

The electrode strips 24 are formed of a transparent conductive film such as an ITO (Indium Tin Oxide) film, and are formed on the protective layer 23 (a formation region 25 of the protective layer) as shown in FIG. 17 and FIG. 18, extending over to the unformed region 26 of the protective layer 23 beyond the protective layer peripheral portion 23a.

The unformed region 26 of the protective layer represents an area where no protective layer 23 is formed, and specifically indicates a region surrounding the protective layer 23, where the top surface of the opposing substrate 20 is exposed.

The electrode width of the electrode strip 24 in typically available high-definition liquid-crystal devices is 100 $\mu$m or so, and the spacing between the electrode strips 24 (hereinafter referred to as a wiring gap G) is typically equal to or narrower than 20 $\mu$m. Particularly, high-definition liquid-crystal devices have a wiring gap G of 12 $\mu$m or smaller.

The elongated rectangular electrode strips 24, constructed of ITO, are manufactured through a so-called photolithographic process. Specifically, the electrode strips are produced through the following manufacturing steps, including the formation of an ITO layer on the protective layer 23 and the opposing substrate 20 through sputtering or the like, the formation of a positive resist layer on the ITO layer, the patterning of the positive resist through exposure and development, and the etching of the ITO using the patterned resist as a mask.

SUMMARY OF THE INVENTION

Since the wiring gap G is extremely narrow, compared to the electrode width of the electrode strip 24, and is subject to variations, the wiring gap G is visually checked using a microscope or the like after the formation of the electrode strips 24.

Since the variations in the wiring gap G become a cause of the position shift of the electrode strips 24 relative to a pixel electrode arranged on the transparent substrate, it is considered the most preferable to inspect the wiring gap G in the formation region 25 of the protective layer 23.

Since a high-reflectance light-shielding layer 22 is present beneath the transparent electrode strip 24 in the formation region 25 of the protective layer 23, particularly in the effective region 27, light rays reflected from the light-shielding layer 22 make it difficult to visually recognize the electrode strip 24 and inspect the wiring gap G in the formation region 25 of the protective layer 23. The inspection of the wiring gap G is normally performed outside the effective region 27, based on the fact that the electrode strips 24 have a constant electrode width in the longitudinal direction thereof.

In the formation step of the above-referenced electrode strips 24, the thickness of a positive resist stacked onto the ITO layer becomes occasionally thicker than a rated thickness in the area of the step portions 23b and 23c. Exposure tends to be insufficient in an area where the thickness of the positive resist is thicker than the rated value, and part of the positive resist is left in the area of the step portions 23b and 23c after development. As shown in FIG. 17, the presence of a resist residue is a cause of the generation of a burr 24x of the electrode strip 24 and the generation of a bridge 24y that causes a shorting between adjacent electrode strips 24, thereby becoming a remote cause of a drop in the yield of the liquid-crystal device.

The generation of the burr 24x and the bridge 24y makes the electrode width of the electrode strips 24 inconstant in the longitudinal direction thereof, the inspection of the wiring gap G outside the effective region 27 becomes meaningless, and an increase in the yield of the liquid-crystal device is difficult.

Short-circuiting between adjacent electrode strips 24 frequently occurs in a high-definition liquid-crystal device having a smaller wiring gap, thereby lowering the yield of the high-definition liquid-crystal device.

The present invention has been developed in view of at least the above problem, and it is an object of the present invention to provide a liquid-crystal device which at least is free from short-circuiting between adjacent electrodes, presents a high yield in manufacturing process, and facilitates the measurement of a wiring gap.

A liquid-crystal device of one exemplary embodiment of the present invention includes a plurality of color material layers arranged on a substrate, a light-shielding layer surrounding each color material layer, a protective layer covering the color material layers and the light-shielding layer, and a plurality of electrode strips arranged on the protective layer and extending from a formation region of the protective layer to an unformed region of the protective layer. The electrode width of the electrode strip on a step portion in the protective layer may be set to be narrower than the electrode width of the electrode strip in the protective layer in an effective region of the liquid-crystal device.

In the liquid-crystal device, the electrode width of the electrode strip may be narrowed in the area where the protective layer has the step portion thereof, and with this arrangement, the spacing between the electrode strips (hereinafter referred to as a wiring gap) in the step portion of the protective layer is widened, and short-circuiting between the electrode strips in the step portion may thereby be prevented.

In another exemplary embodiment of the present invention, in the liquid crystal device described above, part of the electrode width of the electrode strip within the unformed region of the protective layer may be set to be equal to the electrode width of the electrode strip on the protective layer in the effective region.

In the liquid-crystal device, the electrode width of the electrode strip may be narrower at the step portion of the protective layer and the electrode width of the electrode strip in the unformed region of the protective layer may be set to be equal to the electrode width of the electrode strip on the protective layer in the effective region. With this arrangement, the wiring gap of the electrode strips arranged on the step portion of the protective layer increases, and short-circuiting between the electrode strips in the step portion may thus be prevented.

Since the electrode width in the unformed region of the protective layer is equal to the electrode width in the effective region, the wiring gap is measured in the unformed region of the protective layer, and the measurement of the wiring gap may not be hindered by light reflected from the light-shielding layer.

In another exemplary embodiment of the present invention, in the liquid crystal device as described above, a pair of sides of the electrode strip forming the outline of the electrode strip in the longitudinal direction thereof in the unformed region of the protective layer lie in the extensions of a pair of sides of the electrode strip forming the outline of the electrode strip in the longitudinal direction thereof in the protective layer in the effective region.

Since in the liquid-crystal device, the pair of sides of the electrode strip that form the outline of the electrode strip in the longitudinal direction thereof in the unformed region of the protective layer lie in the extensions of the pair of sides of the electrode strip that form the outline of the electrode strip in the longitudinal direction thereof, in the protective layer in the effective region, the wiring gap may be precisely measured in the unformed region of the protective layer.

DETAILED DESCRIPTION OF PREFERRED EMBODIMENTS

First Embodiment

Figure 1:
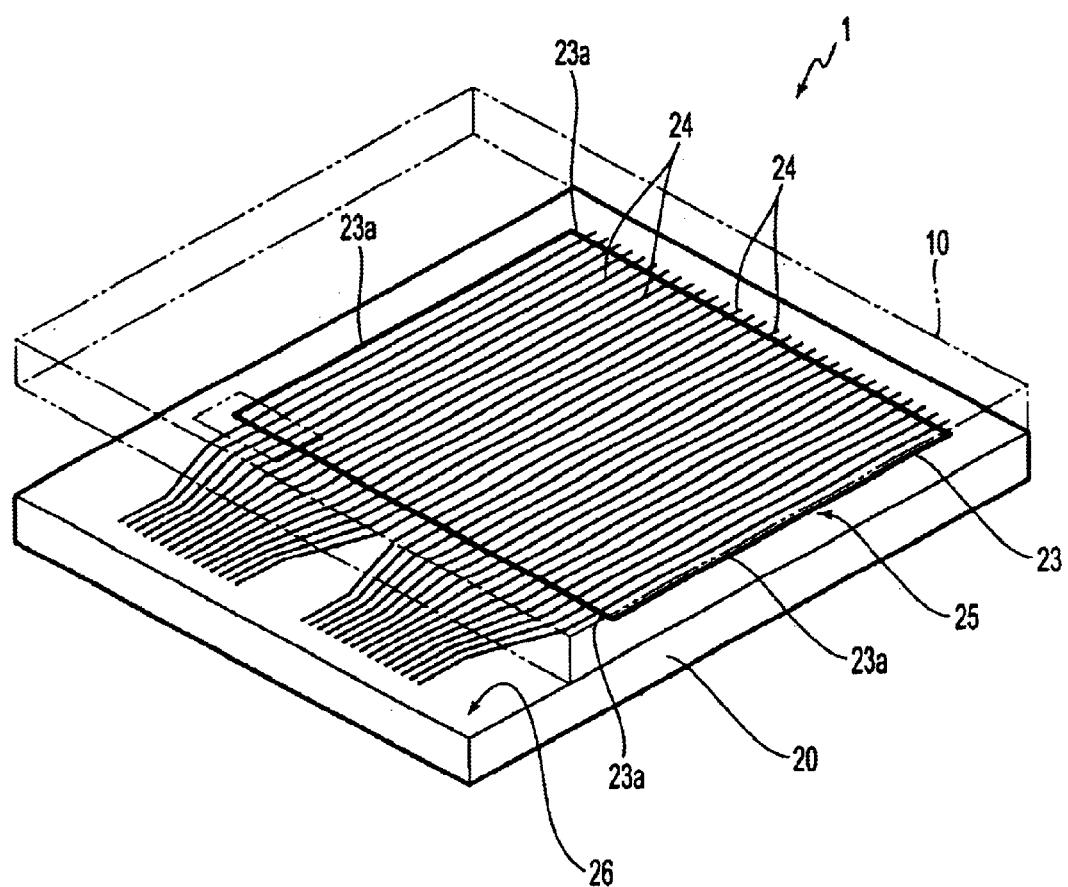
FIG. 1 is a perspective view of a TFD type liquid-crystal device in accordance with a first exemplary embodiment of the present invention.

A first exemplary embodiment of the present invention is now discussed, referring to the drawings.

Figure 2:
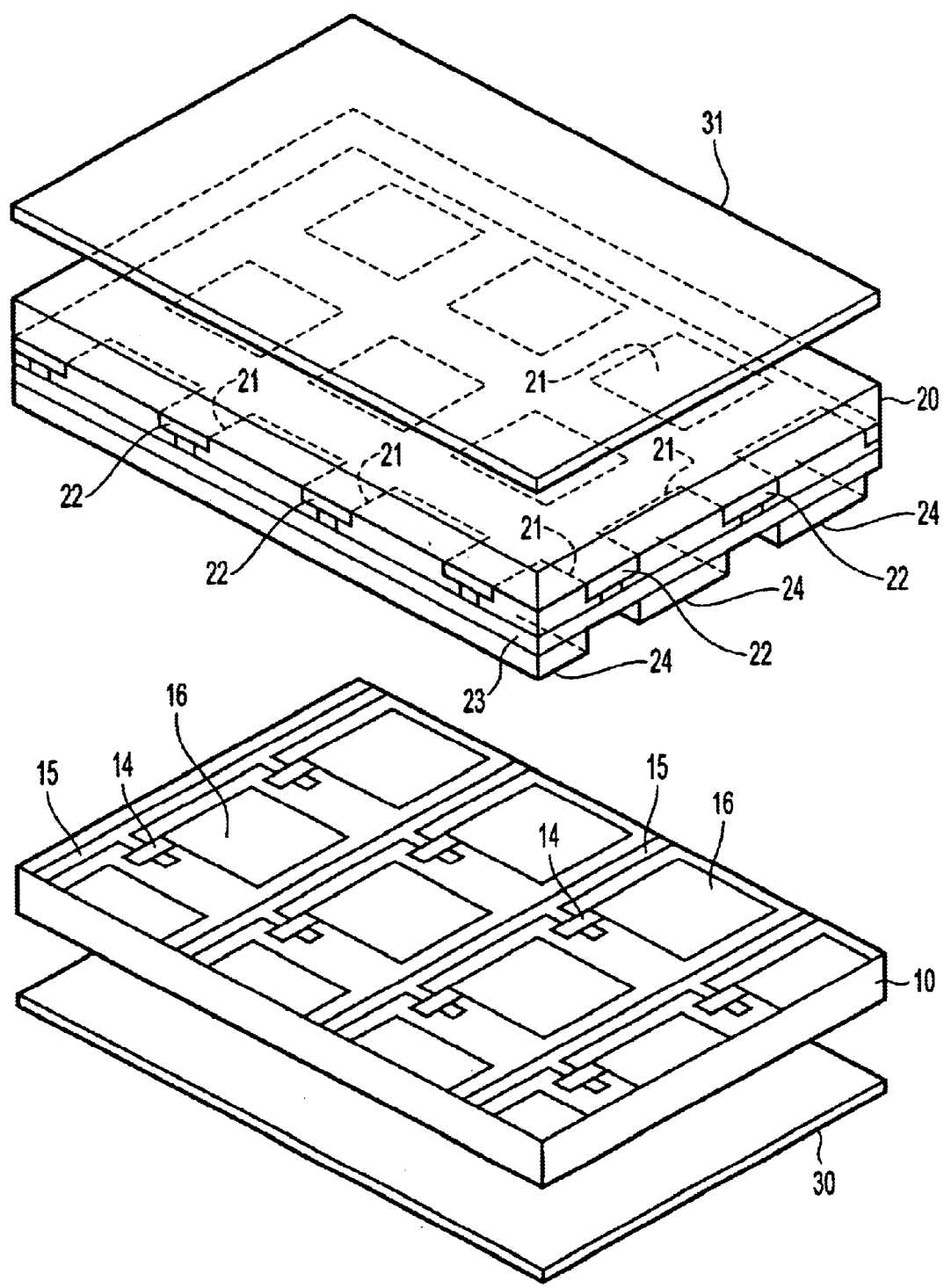
FIG. 2 is a perspective view showing a major portion of the liquid-crystal device of FIG. 1.

FIG. 1 is a perspective view of a liquid-crystal device of the first exemplary embodiment of the present invention, and FIG. 2 is a perspective view of a major portion of the liquid-crystal device of FIG. 1. These figures are intended to explain the construction of the liquid-crystal device, and dimensions, sizes, and thicknesses of components shown here are different from the dimensional relationship of the actual liquid-crystal device.

The liquid-crystal device 1 shown in FIG. 1 employs a TFD (Thin Film Diode) device, and as shown, includes a transparent substrate 10, i.e., a so-called array substrate, on which the TFD device is formed, and an opposing substrate 20 arranged in a position opposing to the transparent substrate 10.

As shown in FIG. 2, the transparent substrate 10 includes a matrix of TFD devices 14, and lines 15 serving as a plurality of signal lines or scanning lines. Each of the lines 15 connects to a plurality of the TFD devices 14 in series. Each of the TFD devices 14 is connected to each of pixel electrodes 16.

As shown in FIG. 2, polarizers 30 and 31 are respectively glued onto surfaces of the transparent substrate 10 and the opposing substrate 20, the surfaces being opposite to the opposing surfaces thereof Alignment layers, which are not shown, are formed on the opposing surfaces of the transparent substrate 10 and the opposing substrate 20, and a liquid-crystal layer, spacers and the like are arranged between the opposing alignment layers.

Figure 3:
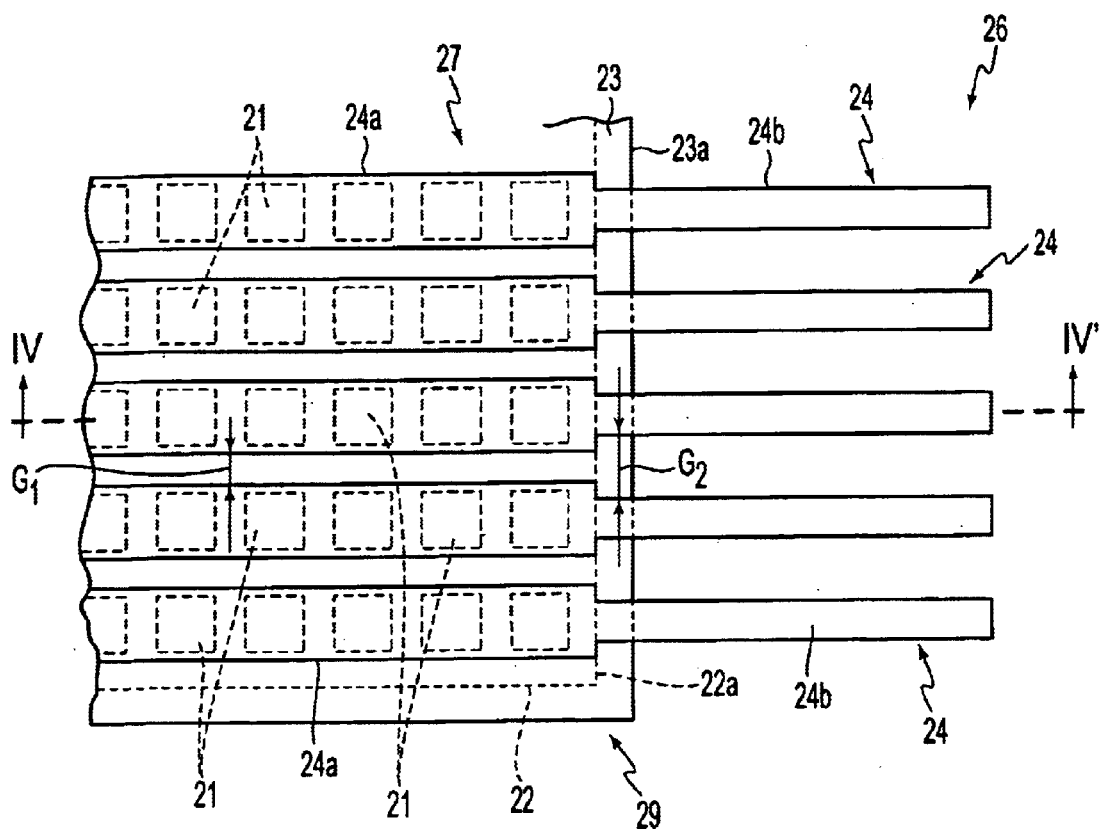
FIG. 3 is a plan view showing a major portion of an opposing substrate of the liquid-crystal device of FIG. 1, enclosed by a two-dot chain line in FIG. 1.
Figure 4:
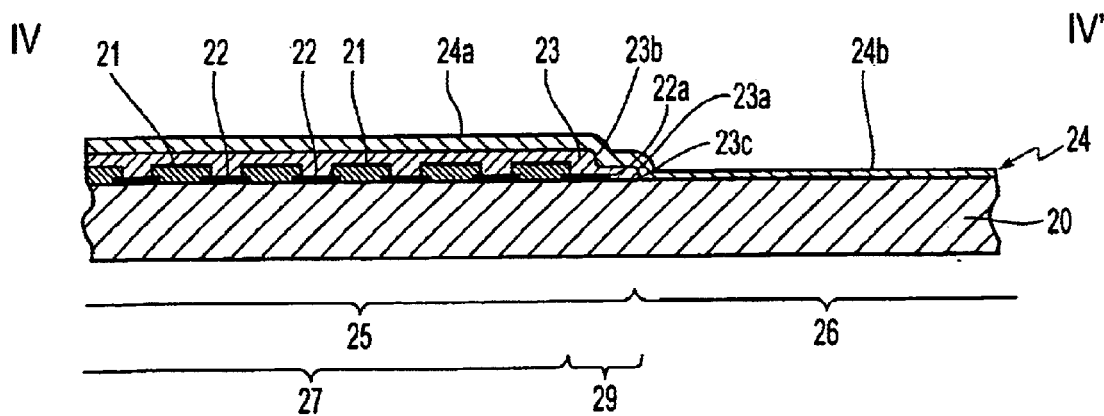
FIG. 4 is a cross-sectional view of the major portion of the opposing substrate, taken along line IV–IV' in FIG. 3.

FIG. 3 is a plan view of a major portion of the opposing substrate 20 (within an outline represented by a two-dot chain line in FIG. 1), and FIG. 4 is a cross-sectional view of the major portion of the opposing substrate, taken along line IV–IV' in FIG. 3. As in FIG. 1 and FIG. 2, these figures are intended to explain the construction of the liquid-crystal device, and dimensions, sizes, and thicknesses of components shown here are different from the dimensional relationship of the actual liquid-crystal device.

As shown in FIG. 2, FIG. 3, and FIG. 4, a plurality of color material layers 21 are formed on the opposing substrate 20 (on the underside of the opposing substrate 20 in FIG. 2), and a matrix of a light-shielding layer 22, constructed of chromium, is formed between the color material layers 21.

As shown in FIG. 2 to FIG. 4, a protective layer 23 is arranged on the opposing substrate 20 to cover the color material layers 21 and the light-shielding layer 22. The color material layers 21, the light-shielding layer 22 and the protective layer 23 form a so-called color filter.

The color material layers 21 are colored in one of red (R), green (G), and blue (B), and are arranged in a mosaic pattern, although the color material layers 21 may be arranged in another pattern such as a stripe pattern or a triangular pattern.

The light-shielding layer 22 is arranged in a matrix to surround the color material layers 21, and is constructed of chromium or the like, and has the function as a so-called black matrix, i.e., the function of improving contrast and preventing the mixing of the color materials.

Referring to FIG. 4, the protective layer 23 has a step portion 23b formed by the color material layer 21 on the outermost outline of an effective region 27 and a light-shielding layer outline portion 22a that forms the outermost configuration of the light-shielding layer 22. The protective layer 23 also has a step portion 23c formed by the thickness of the protective layer 23 at a protective layer peripheral portion 23a that forms the outline of the protective layer 23. A region 29, where the protective layer has a step (hereinafter referred to as a step portion 29 of the protective layer 23), is formed between the effective region 27 and the unformed region 26 of the protective layer 23.

Since the light-shielding layer 22 is covered with the protective layer 23, the light-shielding layer outline portion 22a is arranged closer to the color material layers 21 than the protective layer peripheral portion 23a.

The total height of the step portions 23b and 23c is approximately 5 μm.

A plurality of elongated rectangular electrode strips 24 are formed on the protective layer 23 (on the underside of the protective layer 23 in FIG. 2), and function as scanning electrodes or data electrodes.

The electrode strips 24 are constructed of a transparent conductive film such as an ITO (Indium Tin Oxide) film, are formed on the protective layer 23 (a formation region 25 of the protective layer) as shown in FIG. 4, and extend over to the unformed region 26 of the protective layer 23 beyond the protective layer peripheral portion 23a.

The unformed region 26 of the protective layer 23 represents an area where no protective layer 23 is formed, and specifically indicates a region surrounding the protective layer 23, where the top surface of the opposing substrate 20 is exposed.

The area, surrounded by the color material layers positioned at the outline of the effective area, is hereinafter referred to as an effective region 27.

An electrode strip 24 includes an electrode base portion 24a arranged in the effective region 27, and an electrode narrow portion 24b that is arranged in the step portion 29 and the unformed region 26 of the protective layer 23 and connected to the electrode base portion 24a. In this exemplary embodiment, the electrode narrow portion 24b is connected to the electrode base portion 24a in the light-shielding layer outline portion 22a, but the junction thereof may be set to be a little closer to the color material layer 21.

The electrode widths of the electrode base portion 24a and the electrode narrow portion 24b respectively remain constant in the longitudinal directions thereof.

The electrode width of the electrode narrow portion 24b is set to be narrower than the electrode width of the electrode base portion 24a.

In this way, the electrode width of the electrode strips 24 in the step portion 29 of the protective layer is narrower than the electrode width in the effective region 27.

The spacing between the electrode strips 24 in the step portion 29 of the protective layer (hereinafter referred to as a wiring gap G2) is larger than the spacing between the electrode strips 24 in the effective region 27 (hereinafter referred to as a wiring gap G1).

Specifically, the electrode width of the electrode base portion 24a falls within a range of 70–200 μm, and is typically 100 μm or so, and the electrode width of the electrode narrow portion 24b falls within a range of 60–180 μm, and is typically 96 μm. The wiring gap G1 is equal to or less than 20 μm, and is equal to or less than 12 μm in high-definition liquid-crystal devices.

The wiring gap G2 of the electrode narrow portion 24b is equal to or less than 24 μm, and is equal to or less than 16 μm in high-definition liquid-crystal devices.

The sizes of the electrode width and the wiring gap are not limited to the above-referenced ranges, and may be arbitrarily modified.

The electrode strips 24 are formed through the photolithographic technique, as will be discussed below.

Figure 5:
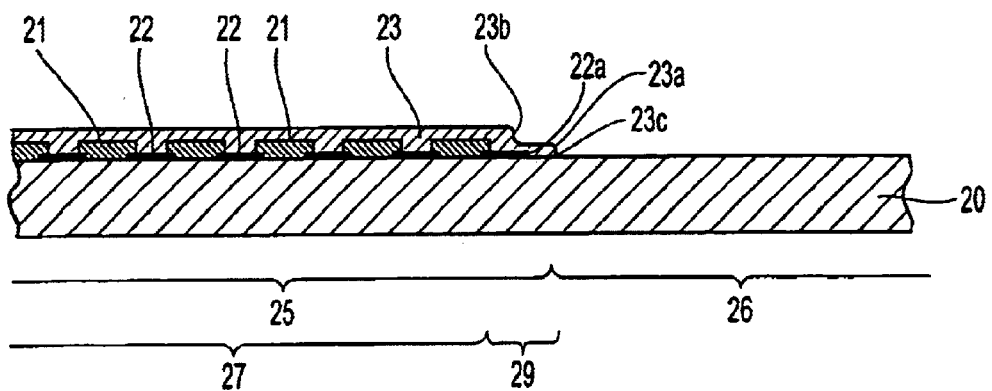
FIG. 5 is a manufacturing process diagram explaining the manufacturing method of the opposing substrate of the liquid-crystal device shown in FIG. 1.

Referring to FIG. 5, the light-shielding layer 22, the color material layers 21, and the protective layer 23 are successively laminated on the opposing substrate 20 to produce a color filter.

Figure 6:
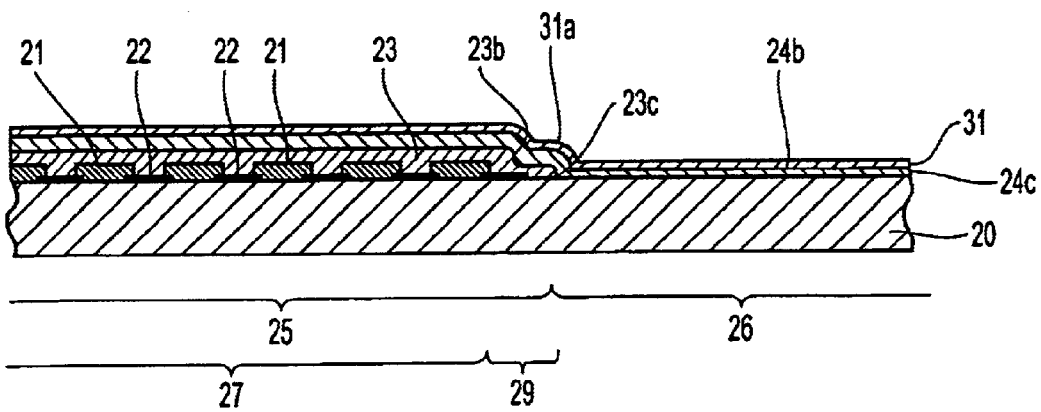
FIG. 6 is a manufacturing process diagram explaining the manufacturing method of the opposing substrate of the liquid-crystal device shown in FIG. 1.

Next, an ITO layer 24c and a positive photoresist layer 31 are successively laminated on the protective layer 23 and the opposing substrate 20 as shown in FIG. 6, the positive photoresist is irradiated with light using a predetermined mask to subject the photoresist layer 31 to exposure and development, and the ITO layer is partly etched away using the patterned photoresist layer.

Referring to FIG. 6, the ITO layer 24c is thus laminated on the protective layer 23 and the opposing substrate 20, and the positive photoresist layer 31 is then deposited on the ITO layer 24c. A step portion 31a, resulting from the step portion 29, is formed in the positive photoresist layer 31 or the resist 31 is applied in a manner such that the step portion of the protective layer is filled. For this reason, exposure may be insufficiently performed in the step portion 31a of the resist layer, leaving part of the resist layer 31 after etching.

The wiring gap G2 for the electrode strips 24 formed in the area of the step portion 31a is large, and even if the photoresist layer 31 is left in that portion, the resist layer is not left in a manner such that the electrode strips 24 short with each other, because of a large wiring gap G2.

Figure 7:
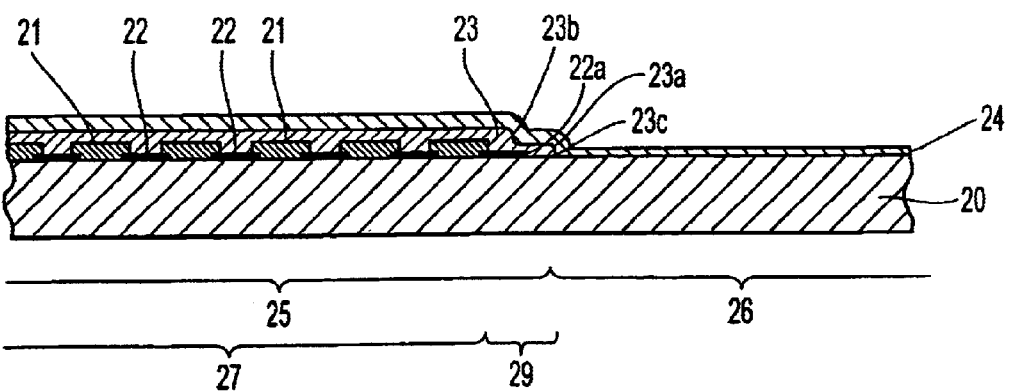
FIG. 7 is a manufacturing process diagram explaining the manufacturing method of the opposing substrate of the liquid-crystal device shown in FIG. 1.

As shown in FIG. 7, the electrode strips 24 shown in FIG. 2 and FIG. 3 are obtained by removing the residual photoresist layer 31.

In the above-referenced liquid-crystal device, the wiring gap G2 in the step portion 29 of the protective layer is large because the electrode width of the electrode narrow portion 24b of the electrode strip 24 is narrower than the electrode width of the electrode base portion 24a, and the electrode strips 24 in the step portion of the protective layer are prevented from shorting with each other.

Second Exemplary Embodiment

A second exemplary embodiment of the present invention is now discussed, referring to the drawings.

Figure 8:
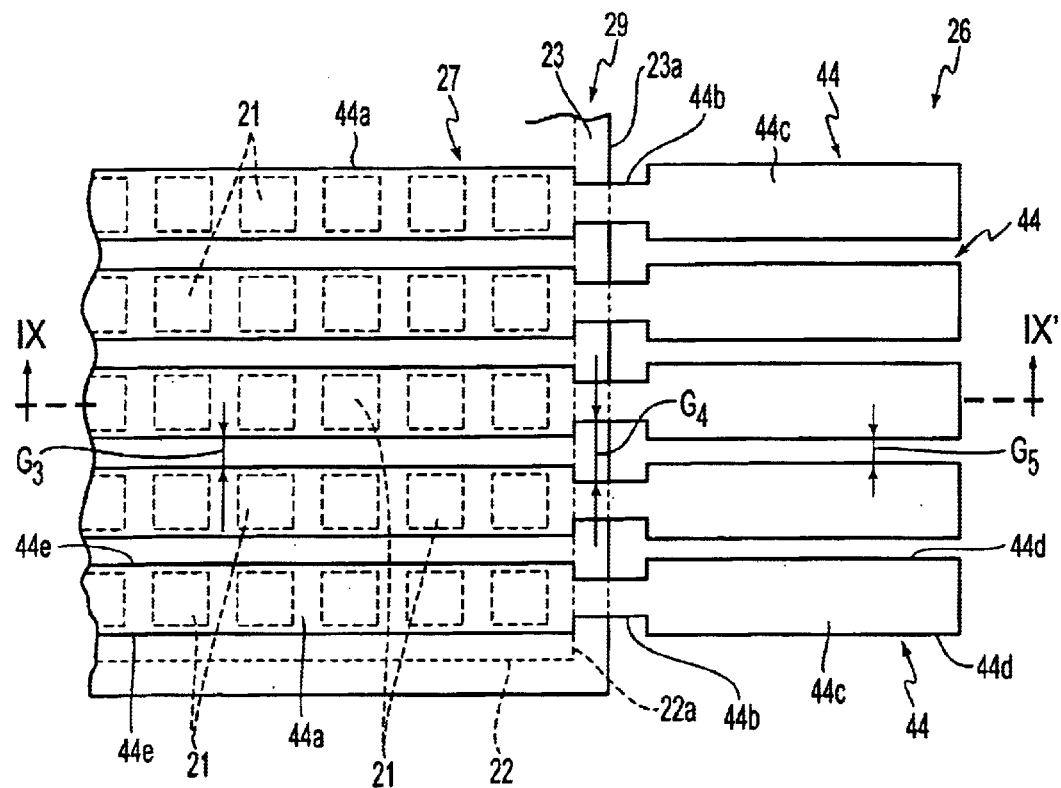
FIG. 8 is a plan view showing a major portion of the opposing substrate of a liquid-crystal device of a second exemplary embodiment of the present invention.
Figure 9:
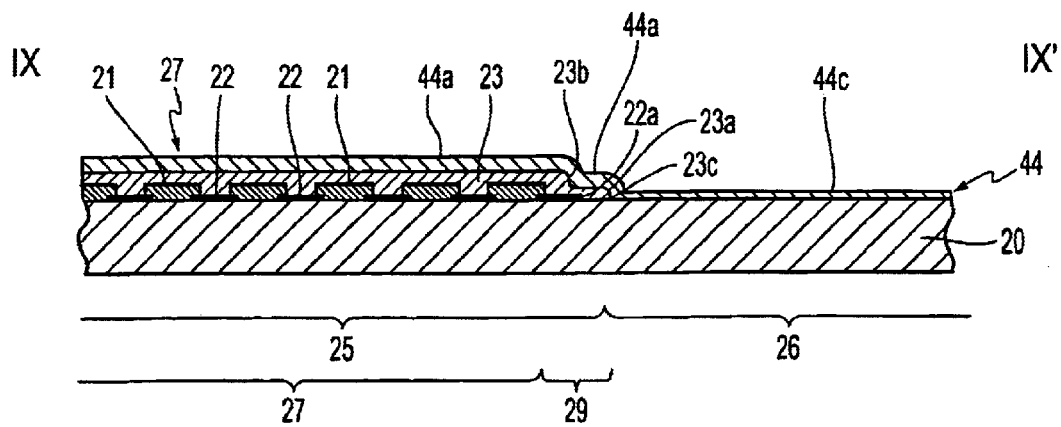
FIG. 9 is a cross-sectional view of the major portion of the opposing substrate, taken along line IX–IX' in FIG. 8.

FIG. 8 is a plan view showing a major portion of a opposing substrate 20 of a liquid-crystal device of the second exemplary embodiment of the present invention, and FIG. 9 is a cross-sectional view of the major portion of the opposing substrate, taken along line IX–IX' in FIG. 8.

Like FIG. 1 to FIG. 4, these figures are intended to explain the construction of the liquid-crystal device, and dimensions, sizes, and thicknesses of components shown here are different from the dimensional relationship of the actual liquid-crystal device.

The components shown in FIG. 8 and FIG. 9, identical to those shown in FIG. 3 and FIG. 4, are designated with the same reference numerals, and the discussion thereabout is entirely omitted or briefly made.

Referring to FIG. 8 and FIG. 9, a plurality of color material layers 21 are formed on an opposing substrate 20, and a matrix of a light-shielding layer 22 constructed of chromium is arranged between the color material layers 21.

Further arranged on the opposing substrate 20 is a protective layer 23 which covers the color material layers 21 and the light-shielding layer 22, as shown in FIG. 9. The color material layers 21, the light-shielding layer 22 and the protective layer 23 form a so-called color filter.

Referring to FIG. 9, the protective layer 23 has a step portion 23b formed by the color material layer 21 on the outermost outline of an effective region of the substrate and a light-shielding layer outline portion 22a that forms the outermost configuration of the light-shielding layer 22. The protective layer 23 also has a step portion 23c formed by the thickness of the protective layer 23 at a protective layer peripheral portion 23a that forms the outline of the protective layer 23. The protective layer 23 has a step portion 29 between the protective layer 23 in the effective region 27 and the unformed region 26 of the protective layer 23.

Since the light-shielding layer 22 is covered with the protective layer 23, the light-shielding layer outline portion 22a is arranged closer to the color material layers 21 than the protective layer peripheral portion 23a.

The total height of the step portion 29 is approximately 5 $\mu$m.

A plurality of elongated rectangular electrode strips 44 are formed on the protective layer 23 (on the underside of the protective layer 23).

The electrode strips 44 are constructed of a transparent conductive film such as an ITO (Indium Tin Oxide) film, and are formed on the protective layer 23 (a formation region 25 of the protective layer) as shown in FIG. 8 and FIG. 9, and extend over to the unformed region 26 of the protective layer 23 beyond the protective layer peripheral portion 23a.

Referring to FIG. 8, an electrode strip 44 includes an electrode base portion 44a arranged in the effective region 27, an electrode narrow portion 44b that is arranged in a step portion 29 of the protective layer and connected to the electrode base portion 44a, and an electrode terminal portion 44c that is arranged in the unformed region 26 of the protective layer 23 and connected to the electrode narrow portion 44b.

The electrode narrow portion 44b extends over the step portion 29 of the protective layer and beyond the protective layer peripheral portion 23a. In this embodiment, the electrode narrow portion 44b is connected to the electrode base portion 44a in the light-shielding layer outline portion 22a, and is connected to the electrode terminal portion 44c outside the protective layer peripheral portion 23a, but the junction between the electrode base portion 44a and the electrode narrow portion 44b may be set to be a little closer to the color material layer 21.

The electrode widths of the electrode base portion 44a, the electrode narrow portion 44b, and the electrode terminal portion 44c respectively remain constant in the longitudinal directions thereof.

The electrode width of the electrode narrow portion 44b is set to be narrower than the electrode widths of the electrode base portion 44a and the electrode terminal portion 44c. The electrode width of the electrode base portion 44a is set to be equal to the electrode width of the electrode terminal portion 44c.

A pair of sides 44d of the electrode terminal portion 44c that form the outline of the electrode terminal portion 44c in the longitudinal direction thereof lie in the extensions of a pair of sides 44e of the electrode base portion 44a that form the outline of the electrode base portion 44a in the longitudinal direction thereof.

The wiring gap G4 in the step portion 29 of the protective layer 23 is larger than the wiring gap G3 in the effective region 27. The wiring gap G3 in the effective region 27 is equal to the wiring gap G5 in the unformed region 26 of the protective layer 23.

Specifically, the electrode widths of the electrode base portion 44a and the electrode terminal portion 44c fall within a range of 70–200 $\mu$m, and are typically 100 $\mu$m or so, and the electrode width of the electrode narrow portion 44b falls within a range of 60–180 $\mu$m, and is typically 96 $\mu$m. The wiring gaps G3 and G5 for the electrode base portion 44a and the electrode terminal portion 44c are equal to or less than 20 $\mu$m, and are equal to or less than 12 $\mu$m in high-definition liquid-crystal devices.

The wiring gap G4 for the electrode narrow portion 44b is equal to or less than 24 $\mu$m, and is equal to or less than 16 $\mu$m in high-definition liquid-crystal devices.

The sizes of the electrode width and the wiring gap are not limited to the above-referenced ranges, and may be arbitrarily modified.

Since the electrode width of the electrode narrow portion 44b of the electrode strip 44 is set to be narrower than the electrode width of the electrode base portion 44a in the liquid-crystal device of this embodiment, the wiring gap G4 in the step portion 29 becomes large, preventing the electrode strips 44 from shorting with each other in the vicinity of the step portion 23b at the light-shielding layer outline portion 22a.

Even if the measurement of the wiring gap G3 in the effective region 27 is hindered by the light reflected from the light-shielding layer 22, the size of the wiring gap G3 can be known by measuring the wiring gap G5, because the wiring gap G5 in the electrode terminal portion 44c is equal to the wiring gap G3.

Since the pair of sides 44d of the electrode terminal portion 44c that form the outline of the electrode terminal portion 44c in the longitudinal direction thereof lie in the extensions of the pair of sides 44e of the electrode base portion 44a that form the outline of the electrode base portion 44a in the longitudinal direction thereof, the wiring gap G3 in the electrode base portion 44a is precisely measured by measuring the wiring gap G5.

Another Construction of the Liquid-crystal Display Device

In the first and second exemplary embodiments, the present invention is implemented in the liquid-crystal device of the TFD device type, but the present invention is not limited to this. For instance, the present invention may be implemented in a liquid-crystal device of passive-matrix type as shown in FIG. 10.

Figure 10:
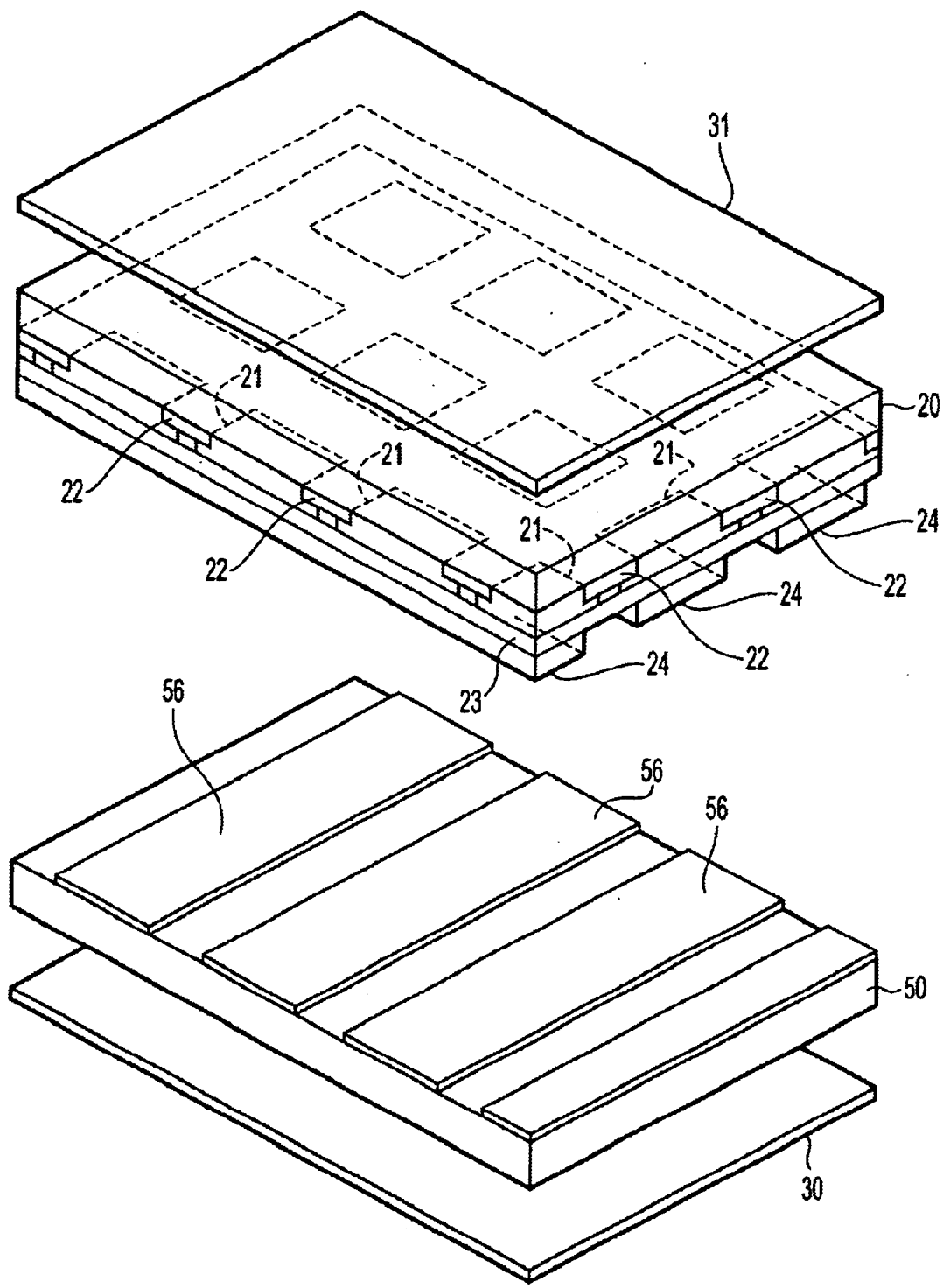
FIG. 10 is a perspective view showing a major portion of a passive-matrix type liquid-crystal device.

FIG. 10 is a perspective view of a major portion of a liquid-crystal device of passive-matrix type. This figure is intended to explain the construction of the liquid-crystal device, and dimensions, sizes, and thicknesses of components shown here are different from the dimensional relationship of the actual liquid-crystal device.

The liquid-crystal device to be discussed here employs the electrode strip 24 discussed in connection with the first exemplary embodiment, but alternatively, the electrode strip 44 discussed in connection with the second exemplary embodiment may be employed.

The liquid-crystal device of passive-matrix type shown in FIG. 10 includes a transparent substrate 50 having a plurality of elongated rectangular electrodes 56 serving as a data line or a scanning line, and an opposing substrate 20 arranged in a position opposing to the transparent substrate 50.

The electrodes 56 are arranged with constant spacings maintained therebetween, and extend in the same direction.

Polarizers 30 and 31 are respectively glued onto surfaces of the transparent substrate 50 and the opposing substrate 20 on the side opposite to each of opposing surfaces thereof. Alignment layers, which are not shown, are formed on the opposing surfaces of the transparent substrate 50 and the opposing substrate 20, and a liquid-crystal layer, spacers and the like are arranged between the opposing alignment layers.

A plurality of color material layers 21 are formed on the opposing substrate 20 (the underside of the opposing substrate 20 in FIG. 10), and a matrix of a light-shielding layer 22, constructed of chromium, is arranged between the color material layers 21.

Further arranged on the opposing substrate 20 is a protective layer 23 which covers the color material layers 21 and the light-shielding layer 22. The color material layers 21, the light-shielding layer 22 and the protective layer 23 form a so-called color filter.

A plurality of elongated rectangular electrode strips 24 serving as the scanning line or the data line, as already detailed, are formed on the protective layer 23 (on the underside of the protective layer 23 shown in FIG. 2). The longitudinal direction of the electrodes strips 24 is perpendicular to the longitudinal direction of the data electrodes 56.

Electronic Equipment

Figure 11:
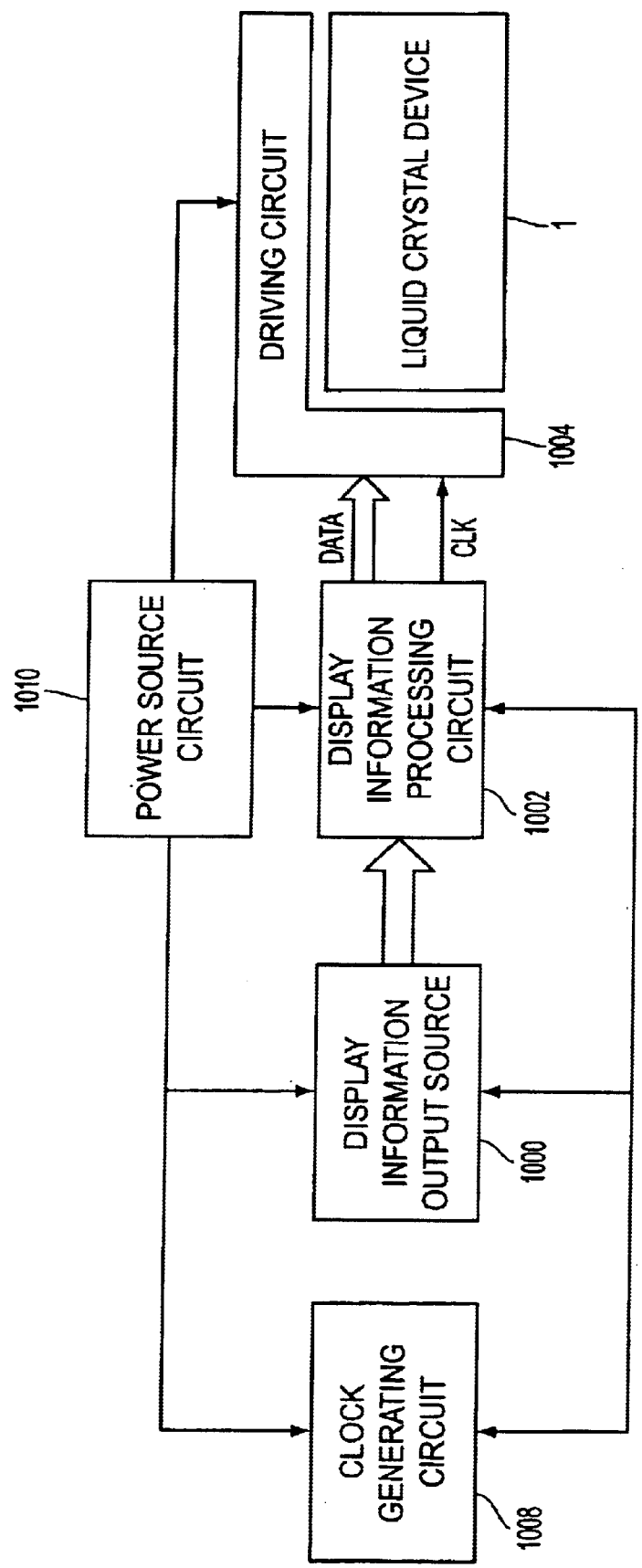
FIG. 11 is a block diagram showing a rough construction of electronic equipment of the present invention.
Figure 12:
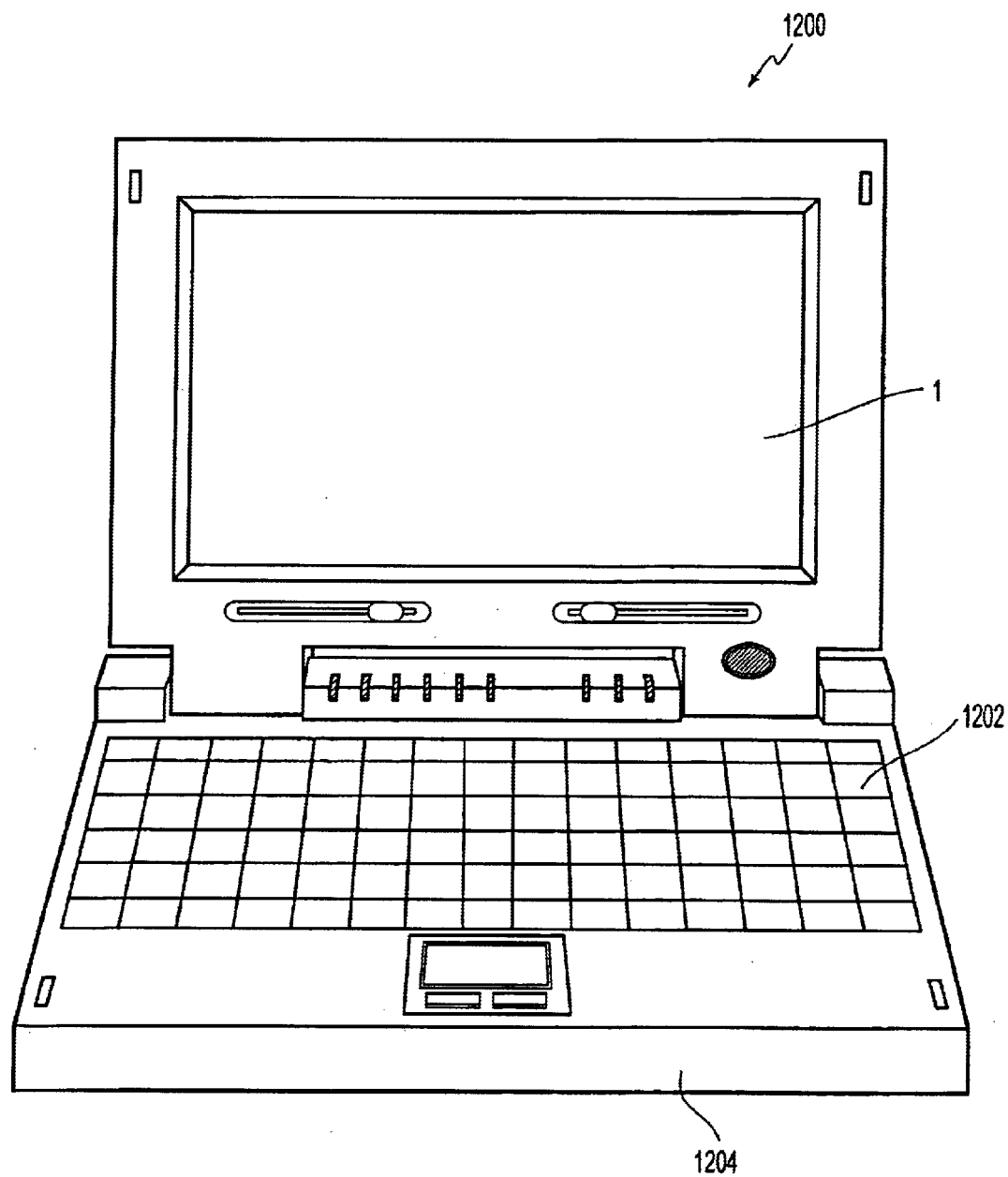
FIG. 12 is a front view showing a personal computer as one example of the electronic equipment.

Exemplary embodiments of electronic equipment incorporating the liquid-crystal device detailed as above are now discussed, referring to FIG. 11 and FIG. 12.

The electronic equipment incorporating the liquid-crystal device of the first exemplary embodiment is discussed here, but alternatively, the liquid-crystal device of the second exemplary embodiment may be employed, and the above-discussed passive-matrix type liquid-crystal device may be employed.

FIG. 11 shows a rough construction of electronic equipment incorporating the liquid-crystal device of the first exemplary embodiment. As shown in FIG. 11, the electronic equipment includes a display information output source 1000, a display information processing circuit 1002, a drive circuit 1004, the above liquid-crystal device 1 of the first exemplary embodiment, a clock generator circuit 1008, and a power source circuit 1010.

The display information output source 1000 includes a memory such as a ROM (Read Only Memory), a RAM (Random Access Memory) or an optical disk, and a tuning circuit for tuning and outputting a video signal. The display information output source 1000 outputs display information such as a video signal in a predetermined format to the display information processing circuit 1002 in response to a clock signal from the clock generator circuit 1008.

The display information processing circuit 1002 includes a variety of known processing circuits such as an amplifier and polarity reversal circuit, a serial-to-parallel converter circuit, a rotation circuit, a gamma correction circuit, and a clamp circuit. The display information processing circuit 1002 successively generates a digital signal from display information inputted in response to the clock signal, and then outputs the digital signal along with the clock signal CLK to the drive circuit 1004. The drive circuit 1004 also drives the liquid-crystal device 1. The power source circuit 1010 supplies power to the display information output source 1000, the display information processing circuit 1002, the drive circuit 1004 and the clock generator circuit 1008.

FIG. 12 shows a specific example of the electronic equipment thus constructed.

Referring to FIG. 12, a laptop multimedia personal computer 1200, as one example of electronic equipment, houses the liquid-crystal device 1 of the first exemplary embodiment in a top cover case thereof, and further includes a body 1204 in which a CPU, a memory, a modem, a keyboard 1202, etc. are assembled.

Figure 13:
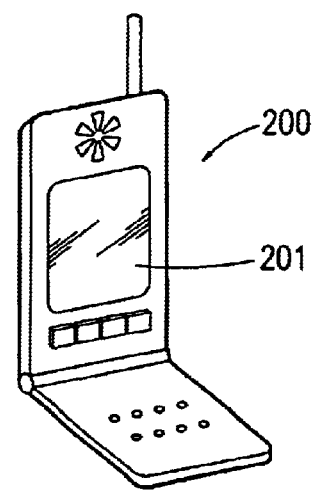
FIG. 13 is a perspective view showing a portable telephone as another example of the electronic equipment.

FIG. 13 shows a portable telephone as another example of the electronic equipment. As shown in FIG. 13, reference numeral 200 represents a body of the portable telephone, and reference numeral 201 represents a liquid-crystal display unit of the liquid-crystal device 1.

Figure 14:
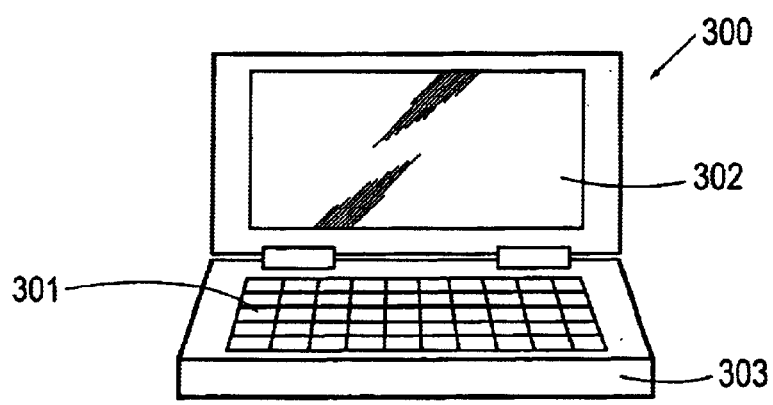
FIG. 14 is a perspective view showing a portable information apparatus as yet another example of the electronic equipment.

FIG. 14 shows a portable information processing apparatus as another example of the electronic equipment, such as a word processor or a personal computer. As shown in FIG. 14, reference numeral 300 represents the information processing apparatus, reference numeral 301 represents an input unit, such as a keyboard, reference numeral 303 represents the body of the information processing apparatus, and reference numeral 302 represents the liquid-crystal display unit employing the liquid-crystal device 1.

Figure 15:
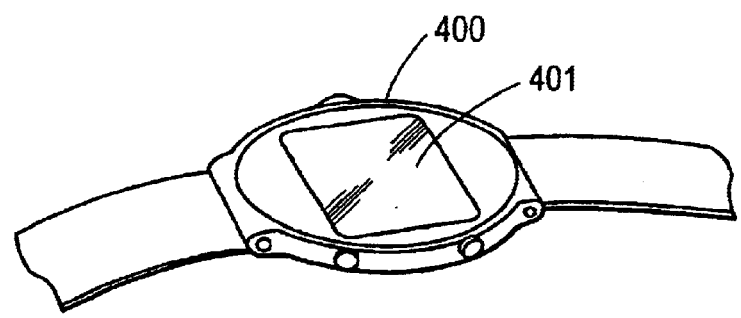
FIG. 15 is a perspective view showing wristwatch as yet another example of the electronic equipment.

FIG. 15 shows a wristwatch as another example of the electronic equipment. As shown in FIG. 15, reference numeral 400 represents the body of the wristwatch, and reference numeral 401 represents a liquid-crystal display unit employing the liquid-crystal device 1.

Figure 16:
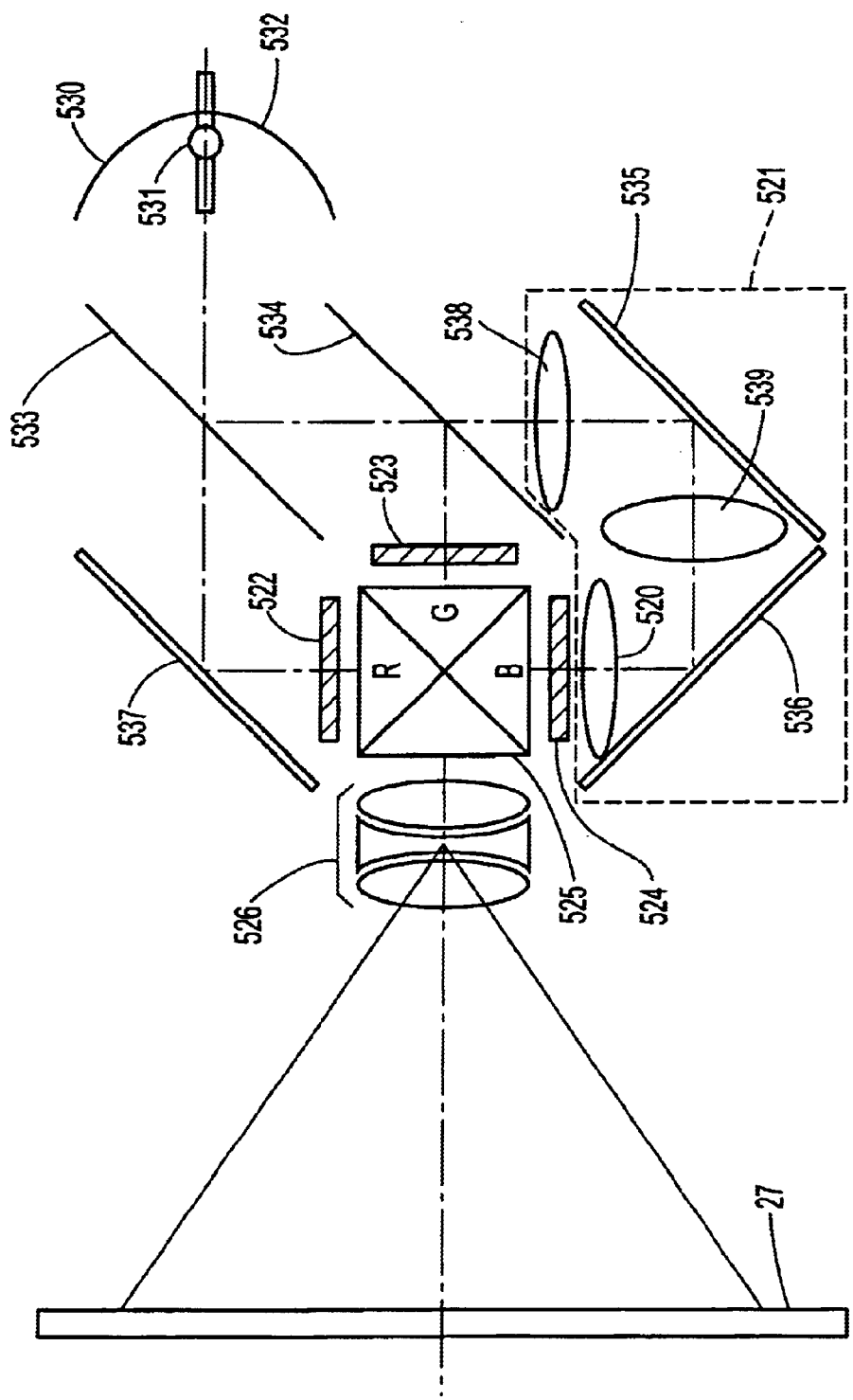
FIG. 16 is a diagram roughly showing a projection display apparatus as yet another example of the electronic equipment.
Figure 17:
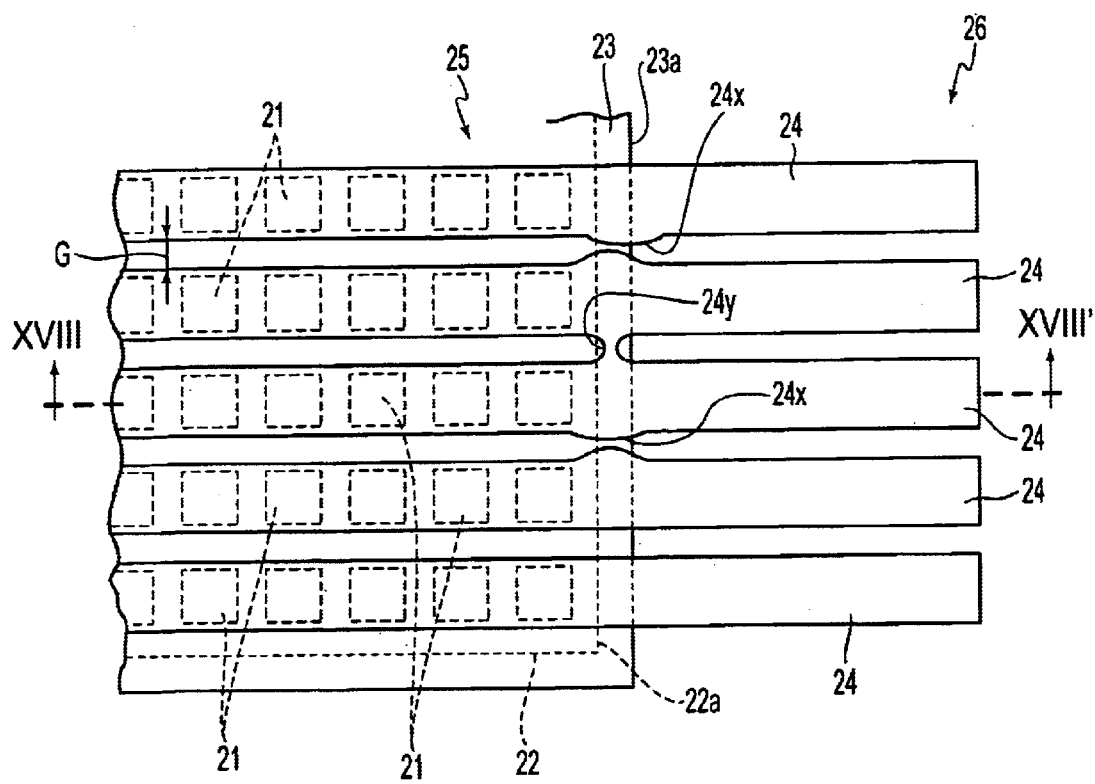
FIG. 17 is a plan view showing a major portion of an opposing substrate of a liquid-crystal device.
Figure 18:
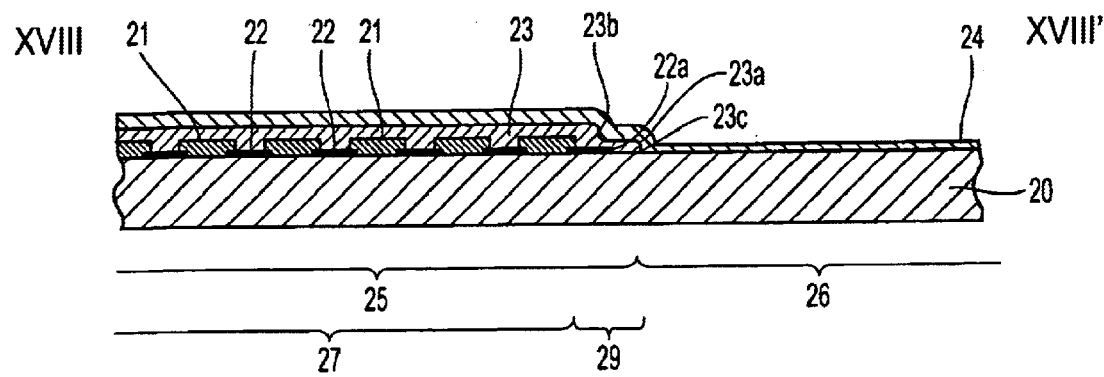
FIG. 18 is a cross-sectional view of the major portion of the opposing substrate, taken along line XVIII–XVIII' in FIG. 17.

FIG. 16 shows a projection display apparatus as yet another example of the electronic equipment.

As shown in FIG. 16, reference numeral 530 represents a light source, reference numerals 533 and 534 represent dichroic mirrors, reference numerals 535, 536, and 537 represent reflective mirrors, reference numeral 538 represents an entrance lens, reference numeral 539 represents a relay lens, reference numeral 520 represents an exit lens, reference numerals 522, 523, and 524 represent liquid-crystal modulators employing the liquid-crystal devices 1, reference numeral 525 represents a cross-dichroic prism, and reference numeral 526 represents a projection lens.

The light source 530 includes a lamp 531, such as a metal halide lamp, and a reflector 532 for reflecting light rays from the lamp 531. The blue and green light reflecting dichroic mirror 533 transmits red light out of a light beam from the light source 530, while reflecting blue light and green light. The transmitted red light is reflected from the reflective mirror 537, and is incident on the red light liquid-crystal modulator 522. On the other hand, the green light, out of the colored light reflected from the dichroic mirror 533, is reflected from the green light reflecting dichroic mirror 534, and is incident on the green light liquid-crystal modulator 523. On the other hand, the blue light is transmitted through the second dichroic mirror 534. A light guide 521, composed of a relay lens system including the entrance lens 538, the relay lens 539 and the exit lens 520, is arranged for the blue light to avoid light loss in a long light path thereof, and the blue light is incident on the blue light liquid-crystal modulator 524 via the light guide 521.

Three color light rays modulated by the light modulators are incident on the cross-dichroic prism 525. This prism is constructed by gluing four right-angle prisms with a red-light reflecting dielectric multilayer film and a blue-light reflecting dielectric multilayer film interposed between interfaces thereof in a cross configuration. These dielectric multilayer films synthesize the three colored light rays to form light indicating a color image. The projection lens 526 constituting a projection optical system projects the synthesized light onto a screen, thereby enlarging and displaying the image on the screen.

Besides the electronic equipment discussed with reference to FIG. 12 through FIG. 16, an example of the electronic equipment shown in FIG. 11 may be liquid-crystal television, viewfinder type or direct-monitor viewing type video tape recorder, car navigation system, electronic pocketbook, electronic tabletop calculator, engineering workstation, video telephone, POS terminal, apparatus having a touch panel, or the like.

As discussed in detail above, the liquid-crystal device of the present invention includes the plurality of elongated rectangular electrode strips extending from the formation region of the protective layer into the unformed region of the protective layer, wherein the electrode width of the electrode strip at least in the step portion of the protective layer is set to be narrower than the electrode width of the electrode strip in the effective region. Thus, the wiring gap in the step portion in the protective layer becomes larger, and this prevents the electrode strips from shorting with each other in the step portion, thereby improving the reliability of the liquid-crystal device.

In the liquid-crystal device of the present invention, the electrode width of the electrode strip in the step portion of the protective layer is set to be narrower than the electrode width in the effective region, while part of the electrode width within the unformed region of the protective layer is equal to the electrode width in the effective region, and the wiring gap in the step portion between the effective region and the unformed region of the protective layer becomes larger, thereby preventing the electrode strips from shorting with each other in the step portion of the light-shielding layer outline portion.

Since the wiring gap is measured in the unformed region of the protective layer, the measurement of the wiring gap is not hindered by the reflected light from the light-shielding layer.

In the liquid-crystal device of the present invention, the pair of sides of the electrode strip that form the outline of the electrode strip in the longitudinal direction thereof in the unformed region of the protective layer lie in the extensions of the pair of sides of the electrode strip that form the outline of the electrode strip in the longitudinal direction thereof in the protective layer in the effective region, this allows the wiring gap for the electrode strips in the effective region to be precisely measured in the unformed region of the protective layer, whereby the yield of high-definition liquid-crystal devices can be increased, and the reliability of the liquid-crystal device can thereby be improved.

What is claimed is:

1. A liquid-crystal device, comprising:
    a substrate;
    a plurality of color material layers of a plurality of colors arranged on the substrate;
    a light-shielding layer surrounding each color material layer;
    a protective layer covering the color material layers and the light-shielding layer; and
    a plurality of electrode strips arranged on the protective layer and extending from a formation region of the protective layer to an unformed region of the protective layer, an electrode width of an electrode strip on a step portion forming an outline of the protective layer in the boundary part of the formation region and the unformed region being set to be narrower than an electrode width of an electrode strip on the protective layer in the formation region, a part of an electrode width of an electrode strip within the unformed region of the protective layer being equal to an electrode width of an electrode strip on the protective layer within the formation region and enabling measurement of a gap of the electrodes.

2. The liquid-crystal device according to claim 1, a pair of sides of an electrode strip that form an outline of an electrode strip in a longitudinal direction thereof in the unformed region of the protective layer lying in extensions of a pair of sides of an electrode strip that forms an outline of an electrode strip in the longitudinal direction thereof on the protective layer in the formation region.

3. Electronic equipment, comprising the liquid-crystal device according to claim 1.

4. The liquid crystal device according to claim 1, a gap between electrode strips adjacent to each other on the step portion is larger than that of electrode strips adjacent to each other on the formation region, electrode strips adjacent to each other on the unformed region being provided with part of a gap which is equal to the gap between the electrode strips on the formation region.

5. A liquid-crystal device, comprising:
   a substrate;
   a plurality of color material layers of a plurality of colors arranged on the substrate;
   a light-shielding layer surrounding each color material layer;
   a protective layer covering the color material layers and the light-shielding layer; and
   a plurality of electrode strips arranged on the protective layer and extending from a formation region of the protective layer to an unformed region of the protective layer, an electrode width of an electrode strip in a step portion forming an outline of the protective layer in the boundary part of the formation region and the unformed region being set to be narrower than an electrode width of an electrode strip on the protective layer in the formation region by approximately 4 $\mu$m, a part of an electrode width of an electrode strip within the unformed region of the protective layer being equal to an electrode width of an electrode strip on the protective layer within the formation region and enabling measurement of a gap of the electrodes.

* * * * *